United States Patent
McBagonluri et al.

(10) Patent No.: US 7,995,817 B2
(45) Date of Patent: Aug. 9, 2011

(54) SYSTEM AND METHOD FOR THE ANALYSIS OF BASIC EAR CANAL TAXONOMY

(75) Inventors: Fred McBagonluri, East Windsor, NJ (US); Raquel Calvachi, Linden, NJ (US); Luis Calvachi, legal representative, Linden, NJ (US)

(73) Assignee: Siemens Hearing Instruments, Inc., Piscataway, NJ (US)

( * ) Notice: Subject to any disclaimer, the term of this patent is extended or adjusted under 35 U.S.C. 154(b) by 966 days.

(21) Appl. No.: 11/872,742

(22) Filed: Oct. 16, 2007

(65) Prior Publication Data
US 2009/0097724 A1    Apr. 16, 2009

(51) Int. Cl.
*G06K 9/00* (2006.01)
(52) U.S. Cl. ....................................................... 382/128
(58) Field of Classification Search .......... 382/128–134; 128/920–925; 356/39–49; 600/407–414, 600/424–426; 345/581–618, 419, 420; 381/322
See application file for complete search history.

(56) References Cited

U.S. PATENT DOCUMENTS

| 5,379,237 A | * | 1/1995 | Morgan et al. .................... 703/2 |
| 2007/0189564 A1 | * | 8/2007 | McBagonluri et al. ....... 381/322 |
| 2008/0143712 A1 | * | 6/2008 | McBagonluri et al. ....... 345/420 |

OTHER PUBLICATIONS

Sloane, N.J.A. Sequences A056981 and A056982, "the On-Line encyclopedia of Integer Sequences".

* cited by examiner

*Primary Examiner* — Samir Ahmed
*Assistant Examiner* — Atiba Fitzpatrick

(57) ABSTRACT

A method and appertaining system determine and output parameters associated with an ear canal according to a particular taxonomy. The output can then be input to various other systems associated with hearing aid design. An intelligent computational approach is utilized that models the physiology of the human ear canal as reconcilable with a conic or quadric section. The canal segment of the impression is sliced, and various parameters are determined according to each slice. Then, these parameters are analyzed in order to create a basic classification of the canal morphology.

20 Claims, 15 Drawing Sheets

SYSTEM AND METHOD FOR THE ANALYSIS OF BASIC EAR CANAL TAXONOMY

BACKGROUND

The present invention is directed to a system and an appertaining method for determining and outputting parameters associated with an ear canal according to a particular taxonomy. The output can then be input to various other systems associated with hearing aid design. More specifically, the present invention utilizes an intelligent computational approach that models the physiology of the human ear canal as reconcilable with a conic or quadric section. Furthermore the output parameters establish a fundamental basis for designing automated 3D design software for hearing instrument design and manufacturing. In the absence of structured classification protocols for human ear canals, algorithms designed to automate design of hearing instruments are usually not robust and are unstable.

This instability is directly related to the inability to develop one system of algorithms for multiple ear canals shapes and complexity associated with any given human population sample. The present invention provides a method and process that allows human ear canals to be classified based on measurement of geometric variability along extracted molds of hearing aid impression. The methods advanced herein further ensure an automated classification of all human ear canal shapes can be implemented.

Hearing aid design involves the creation of hearing aid shells that are shaped to match the wearers ear for purposes of comfort and performance. An important part of the shell design relates to the ear canal and the aspects of the shell that relate to it.

Computer modeling of the ear, based on impressions taken from the wearer's ear, and the corresponding shell design based on these impressions is becoming a standard mechanism in the production of hearing aids.

SUMMARY

The present invention focuses on a technique dealing with the modeling of the ear canal. Accordingly, a classification scheme for classifying hearing instrument impressions is provided with the objective of being able to adapt algorithmic robustness for the different classes of impressions realizable from these classifications.

Accordingly, a method is provided for analyzing and outputting ear canal data characteristics for a hearing aid impression, comprising: loading a 3D data representation of the impression into a storage area of a computer system; performing a classification on the impression to define impression regions, including a canal; defining a total number n of slices of the canal; slicing the canal into n slices; for each slice: determining a set of parameters for each slice; determining whether a cross-sectional shape of each slices is elliptical, hyperbolical, circular, or parabolic; and for all but the first slice, determining whether each of the set of parameters is increasing, decreasing, or remaining uniform; the method further comprising: performing a basic classification of external canal morphology based on the parameter values for each of the slices to classify the canal as having a shape selected from the group consisting of a conical or tapering down shape, a bulb or tapering shape, and a cylindrical or non-tapering shape; and outputting, via a system output, information related to the canal based on the classification information or the slice information.

An appertaining system for executing the method is further provided. Accordingly, a system for determining and outputting ear canal data for a hearing aid impression comprises: an input at which a 3D data representation of the impression is provided; a storage medium for storing the impression data; a processor for running analysis software, the analysis software comprising: an algorithm for classifying the impression to define impression regions, including a canal; an algorithm for slicing the canal into n slices, and then for each slice: determining a set of parameters for each slice; determining whether a cross-sectional shape of each slices is elliptical, hyperbolical, circular, or parabolic; and for all but the first slice, determining whether each of the set of parameters is increasing, decreasing, or remaining uniform; an algorithm for performing a basic classification of external canal morphology based on the parameter values for each of the slices to classify the canal as having a shape selected from the group consisting of a conical or tapering down shape, a bulb or tapering shape, and a cylindrical or non-tapering shape; and a memory for storing the algorithms in a form of processor executable instructions; and an output for outputting information related to the canal based on the classification information or the slice information.

DESCRIPTION OF THE DRAWINGS

The invention is explained in detail below with reference to various preferred embodiments illustrated in the drawings and following descriptive text.

DETAILED DESCRIPTION OF THE PREFERRED EMBODIMENTS

The basis of classification for the ear canal comprises an intelligent computational approach that models the physiology of the human ear canal as reconcilable with a conic or quadric section. This approach provides an advanced analysis by utilizing a cross sectional examination of slices extracted by vertically slicing/scanning the impression from the canal tip near the bony section of the ear towards the interface between the outer and inner ear (aperture) that is represented generally by a characteristic conic or quadric section.

Figure 1A:
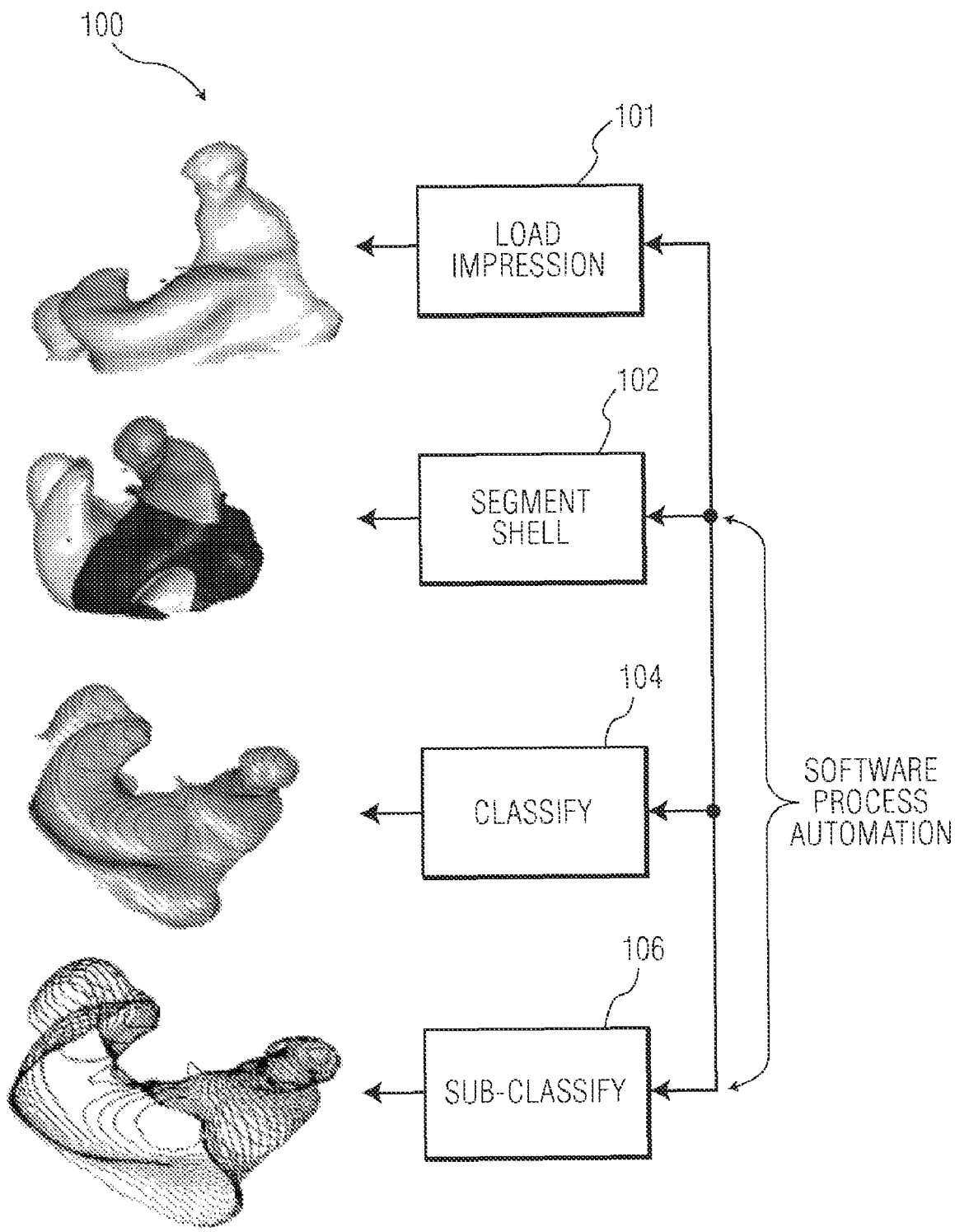
FIGS. 1A & 1B are pictorial flow diagrams illustrating the sequential steps used in the classification.
Figure 1B:
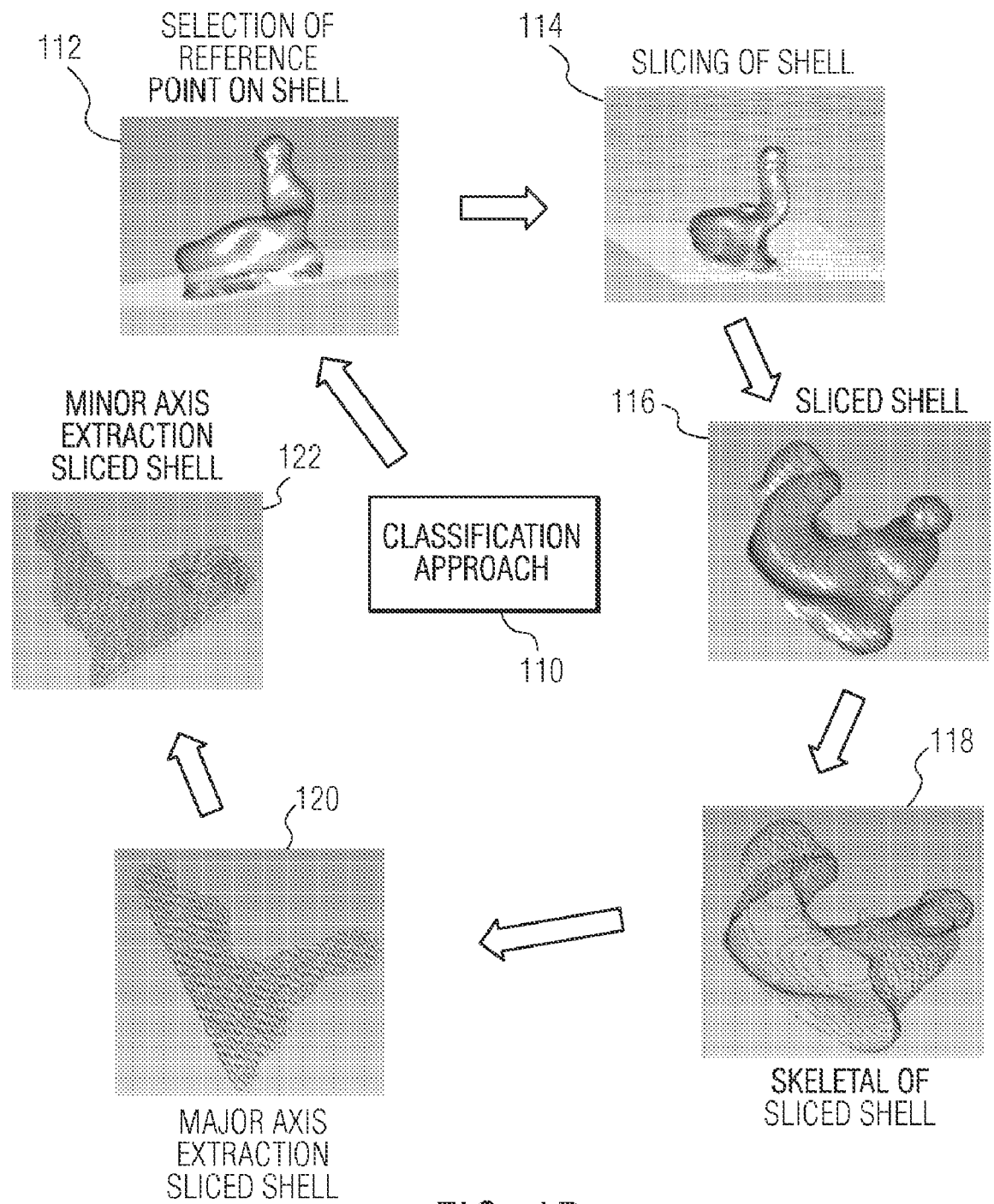
Figure 1C:
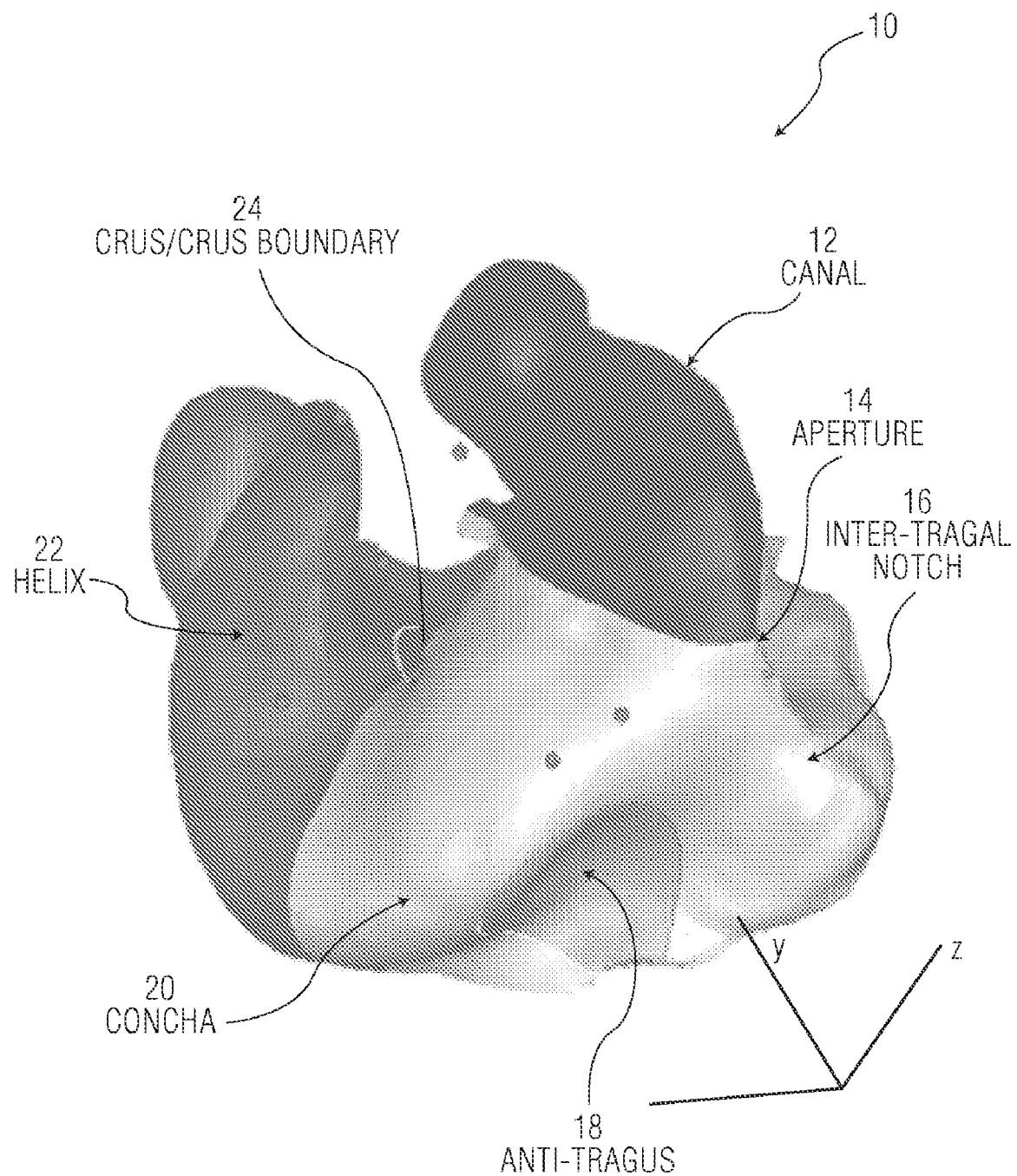
FIG. 1C is an isometric view illustrating the discrete entities that are produced by the 3D modeling software's advanced segmentation algorithms.

The analysis of the canal is generally performed in a context of an analysis of the overall hearing aid shell 10 (FIG. 1C). As illustrated in FIG. 1A, the process 100 is achieved by loading the impression data 102, which can be represented according to any 3D modeling standard for defining a volumetric region, such as a point cloud. Next, the shell is segmented into defined regions 102. FIG. 1C provides an exemplary illustration of shell 10 regions so defined, including the canal 12, aperture 14, inter-tragal notch 16, anti-tragus 18, concha 20, helix 22, and crus/crus boundary 24.

The process consists of a classification routine 104 and subsequent sub-classification routine 106. The segmentation 102 and classification routines 104, 106 are done according to a software automation process.

FIG. 1B illustrates the processing done on the shell itself in the classification approach 110 (104, 106). A reference point is selected on the shell 112 and the shell is sliced along an axis and at some predefined resolution 114, thereby producing a sliced shell 116. The contours produced are construed as a skeletal sliced shell 118, and a major- 120 and minor-axis extraction 122 of the sliced shell are produced for analysis.

Focusing on the canal 12 of the shell/impression, to achieve algorithmic classification of the ear impression canal, the following key areas are addressed: the external morphology of an impression shape, the shape of a cross-sectional area, and the canal angular shape.

Figure 2A:
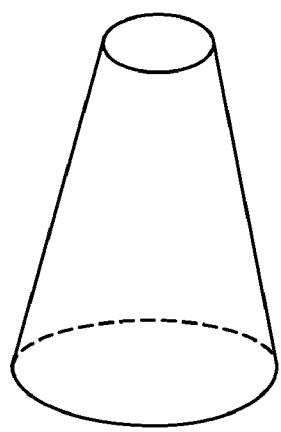
FIGS. 2A-2D are illustrations of various canal shape morphologies.
Figure 2B:
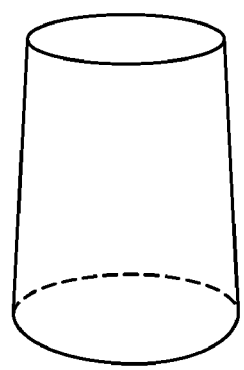
Figure 2C:
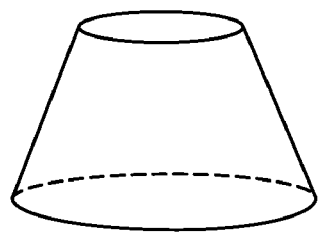
Figure 2D:
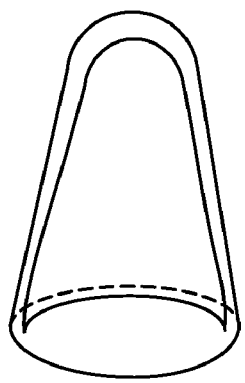

As to the external morphology of an impression shape, FIGS. 2A-2D illustrate characteristic shape morphologies exhibited by the ear canal. FIG. 2A illustrates a conical morphology in which cross-sectional areas are monotonically decreasing from the canal to the aperture with a circular cross section. The eccentricity in this case approaches zero. FIG. 2B illustrates a uniform/cylindrical morphology in which equi-spaced slices of the cross-section, perimeters, and cross-sectional areas of the impression are within some predefined acceptable tolerance (e.g., ~0.1 mm). The canal has a tubular shape. FIG. 2C illustrates an elliptical cylindrical morphology in which the equi-spaced slices indicate a progressive change in the slice size from the canal towards the aperture. Finally, FIG. 2D illustrates a tapered morphology, indicating monotonically increasing or decreasing cross sectional areas.

Figure 3A:
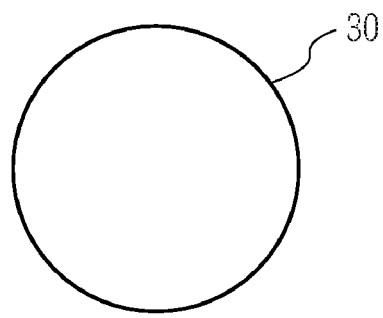
FIGS. 3A-3C are illustrations of characteristic cross-sectional profiles of ear canals.
Figure 3B:
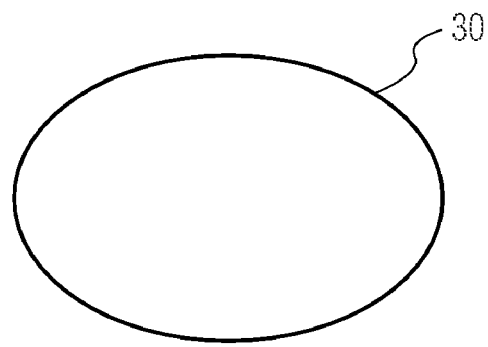
Figure 3C:
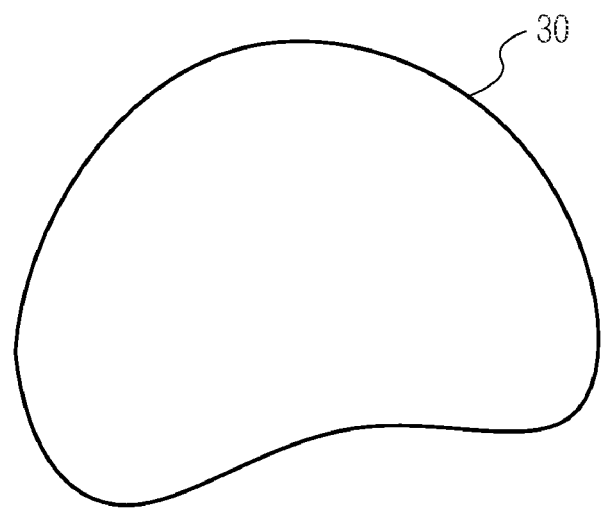

The shape cross-sectional area of the slice 30 is illustrated in FIGS. 3A-C. FIG. 3A illustrates a circular cross-sectional area 30 in which the eccentricity e≈0. FIG. 3B illustrates an elliptical cross-sectional area 30 in which the eccentricity ~0<e<1. FIG. 3C illustrates a non-uniform cross-sectional area 30 where an indeterminate eccentricity e<0.

In addition to the cross-sectional shape, the canal angular shape is determined. The following principal angles are used to characterize changes in ear canal shape towards the inner ear and beginning from the aperture: the twist angle, the bend angle, and the taper angle. The twist angle refers to the stepwise change in canal direction that starts around the aperture. It appears as a rotation in the x-y plane around the z-axis. In certain impressions, the twist appears like stair arranged along a spiral.

Figure 3D:
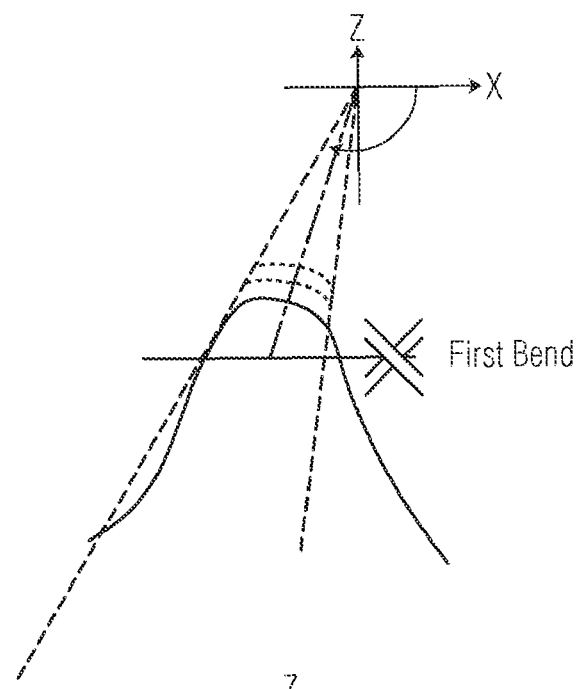
FIGS. 3D-3F are illustrations of the canal tapering angular measurement for ITEs.
Figure 3E:
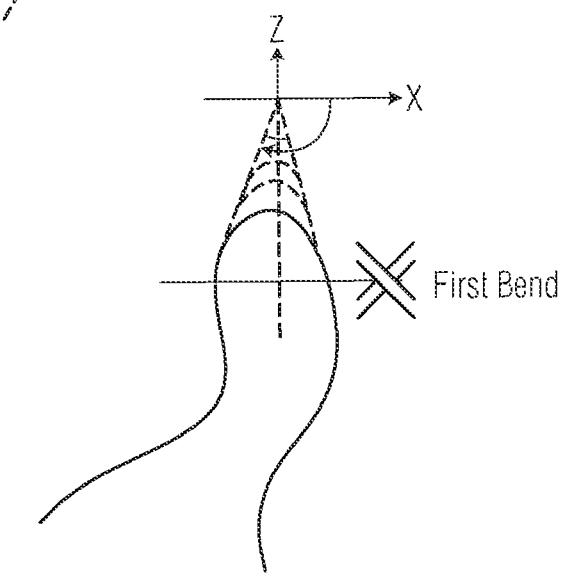
Figure 3F:
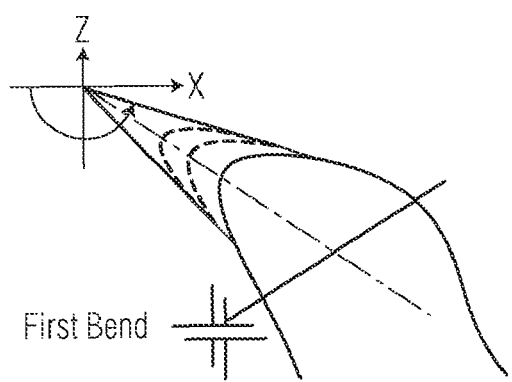

The bend angle refers to a change in direction in the canal length. Sudden directional changes are observed along the first and second bends. It is also common to see the transition from the aperture of the canal in certain impressions. In general, bending can be observed when a centerline is estimated along the geometric center of the impression. The taper angle refers to the conformance of the ear canal towards the bony part of the ear. FIGS. 3D-3F illustrate the canal tapering angular measurement for ITEs and sample canal orientation measurements relative to the bony section of the ear. These angular measurements are with the range of 20-40°.

Figure 4A:
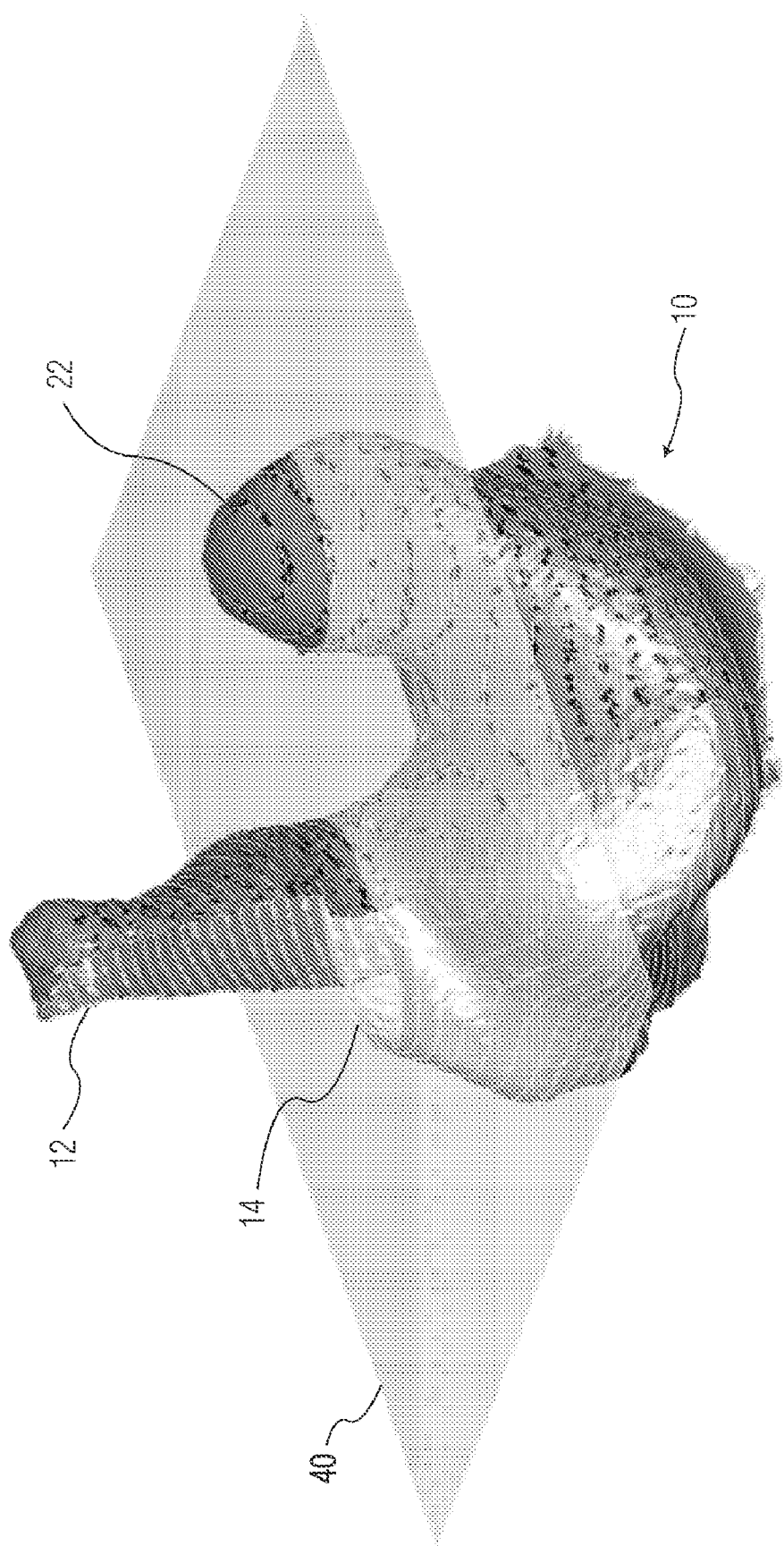
FIG. 4A is a pictorial isometric projection of the mathematical slicing of an impression model where the location of the aperture inter-slicing distance is minor no significant contour size changes.
Figure 4B:
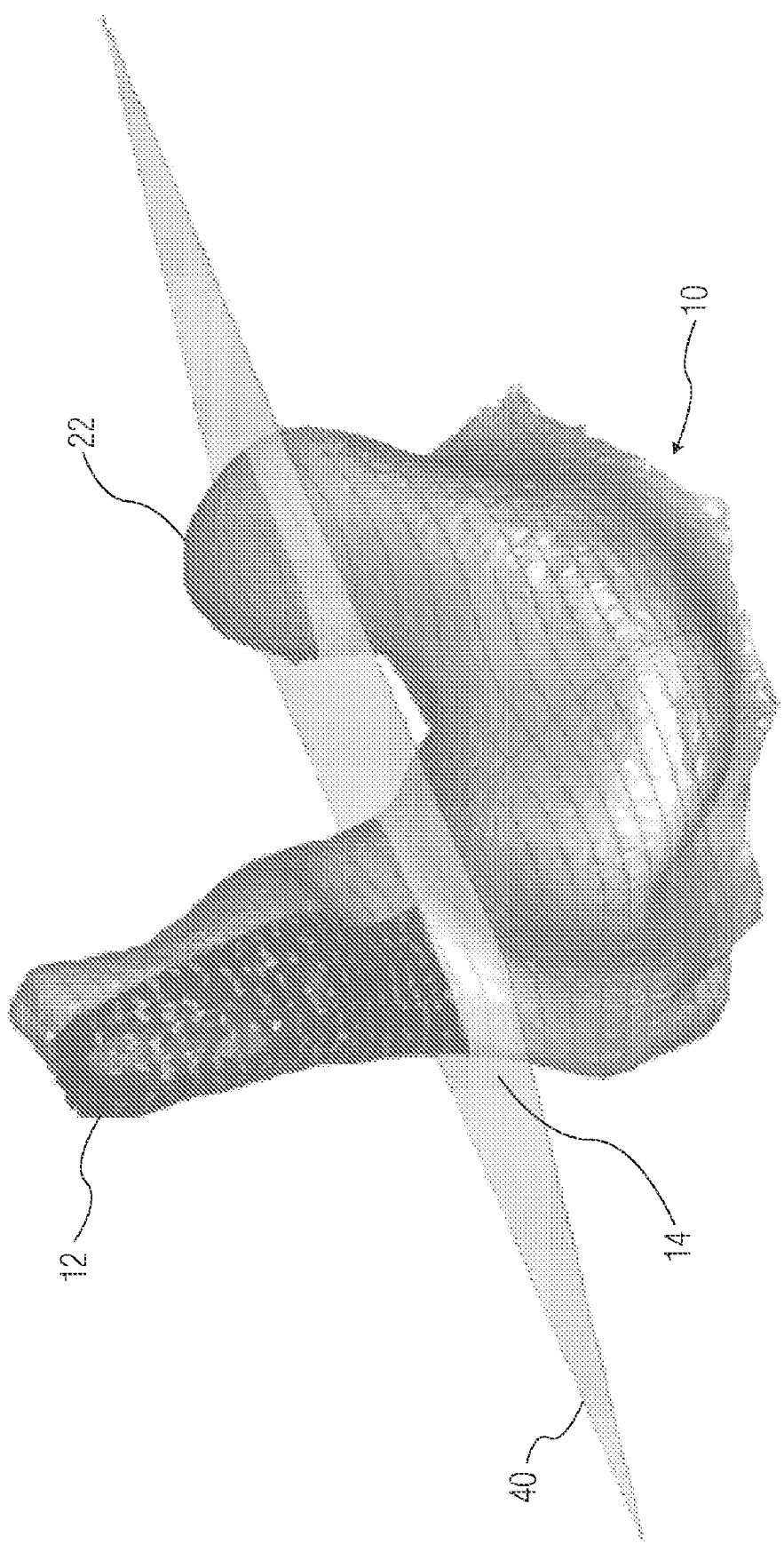
FIG. 4B is a pictorial isometric projection of the mathematical slicing of an impression model with the location of the aperture where cutting plane intersects the helix and the maximum contour.
Figure 5:
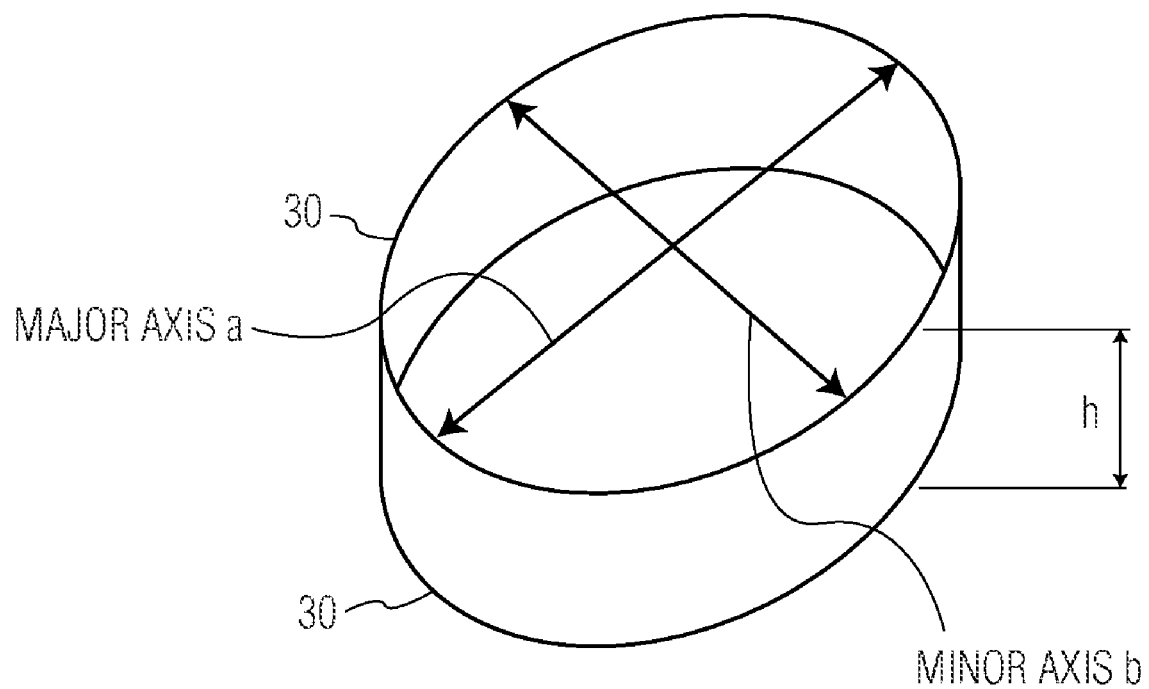
FIG. 5 is a pictorial isometric projection showing a section of an impression canal approximated as a cylinder with minor and major axes, where $\theta \in [0, 2\theta]$ and $z \in [0, h]$.

Referring to FIGS. 4A and 4B, the aperture 14 is the largest contour located at the entrance to the canal 12. It can be located, as shown in FIGS. 4A and 4B, when a dissecting plane 40 along the geometric centerline intersects both the aperture 14 and the helix 22. In FIG. 4A, the location of the aperture inter-slicing distance is minor and no significant contour size changes dramatically. FIG. 4B illustrates the location of aperture 14 where the cutting plane 40 intersects the helix 22 and maximum contour.

The canal 12 itself can be approximated with an elliptic cylinder having semi-major axes a semi-minor axes b and, as illustrated in FIGS. 5 and 6A-6C, where $\theta \in [0, 2\theta]$ and $z \in [0, h]$. A circular cross-section is simply a special case of an elliptical one. The impression 10 can be segmented along three reference lines associated with the canal: the major axis, the minor axis, and parallel slices from the hollowed end or canal tip and centered on the geometric centerline of the canal. By slicing the shell using these references, distinctive changes in intersecting contour can demarcate location of key features.

The actual implementation can be performed according to a method embodiment of the invention described below. The method may be performed on any computer system comprising a user interface having an input and output, storage, one or more processors, and optionally, networking capability.

Figure 6A:
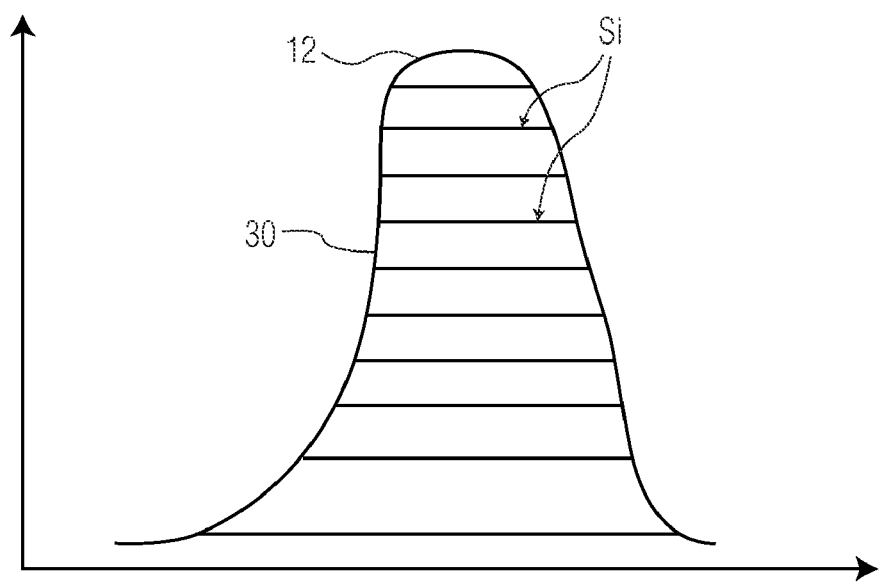
FIG. 6A is a side view of a sliced impression.
Figure 6B:
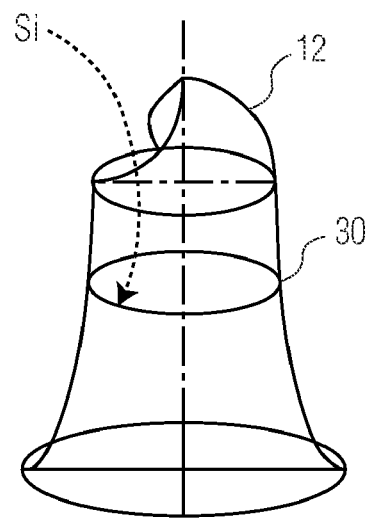
FIG. 6B is an isometric view of a cross-section showing the sliced impression.
Figure 6C:
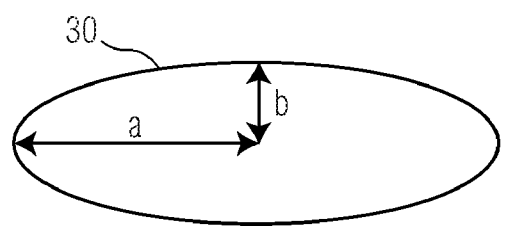
FIG. 6C is a pictorial illustration of an elliptical cross section of the sliced impression with the semi-major and the semi-minor axes defined.

An exemplary algorithm for performing the method begins by defining the total number (n) of elliptical slices 30, S of the canal 12 of the impression 10 (see FIG. 6A). The computational accuracy depends on the number of slices and inter-slicing distance (a typical value, in a preferred embodiment, being 0.01 mm). Then, each elliptical slice is labeled ($S_i$) (FIG. 6B), as are the semi-major ($a_i$) and semi-minor ($b_i$) of each elliptical slice (FIG. 6C). The perimeter ($P_i$) of each elliptical slice $S_i$ is computed; the perimeter of the elliptical slice $S_i$ can be estimated using the Adaptive Gauss-Kummer series (see, e.g., Sloane, N. J. A. Sequences A056981 and A056982 in "The On-Line Encyclopedia of Integer Sequences"; and Coxeter, H. S. M. "Conics" §8.4 in Introduction to Geometry, 2nd ed. New York: Wiley, pp. 115-119, 1969, both incorporated herein by reference): For each slice, the perimeter may be computed as shown iteratively in equation 1:

$$p_i = \pi(a_i + b) \sum_{n=0}^{\infty} \binom{1/2}{n}^2 h_i^n = \pi(a_i + b_i)\left(1 + \frac{1}{4}h_i + \frac{1}{64}h_i^2 + \ldots\right) \quad (1)$$

where $$\binom{n}{k}$$

is the binomial coefficient
and $$h_i = \left(\frac{a_i - b_i}{a_i + b_i}\right)$$

Next, the area ($A_i$) of each elliptical slice Si is computed—this can be obtained by direct integration of equation 2 (FIG. 6C):

$$A_i = \int_{-a_i}^{a_i} \int_{-b_i\frac{\sqrt{a_i^2-x^2}}{a_i}}^{b_i\frac{\sqrt{a_i^2-x^2}}{a_i}} dy\, dx \quad (2)$$

and the eccentricity, ($e_i$) of each elliptical slice $S_i$ is computed.

Then, the cross-sectional shape of each slice $S_i$ is defined (elliptical, hyperbolical, circular, parabolic). It is further determined whether the following parameters: $P_i$, $A_i$, $a_i$, $b_i$, and $e_i$ are: (a) Increasing, (b) Decreasing, or (c) Uniform. A predefined tolerance may be established for each parameter. This predefine tolerance is used for the convergence of the computational algorithms.

$$tol = |P_{i+1} - P_i|$$

If tol is equal to zero, then the slices are uniform; if tol is less than zero then the slices are decreasing; and finally, if tol is greater than zero, then the slices are increasing.

Figure 6D:
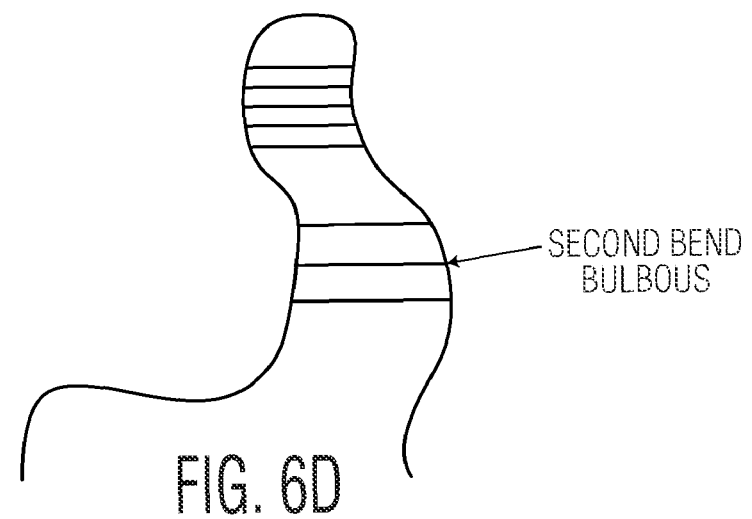
FIGS. 6D-F are pictorial illustrations of characteristic bulbous impressions showing dramatic changes in a vertical scan of the ear impression.
Figure 6E:
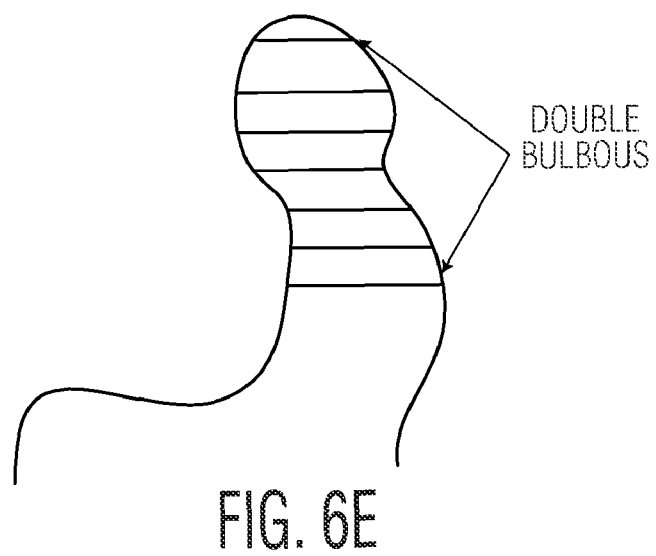
Figure 6F:
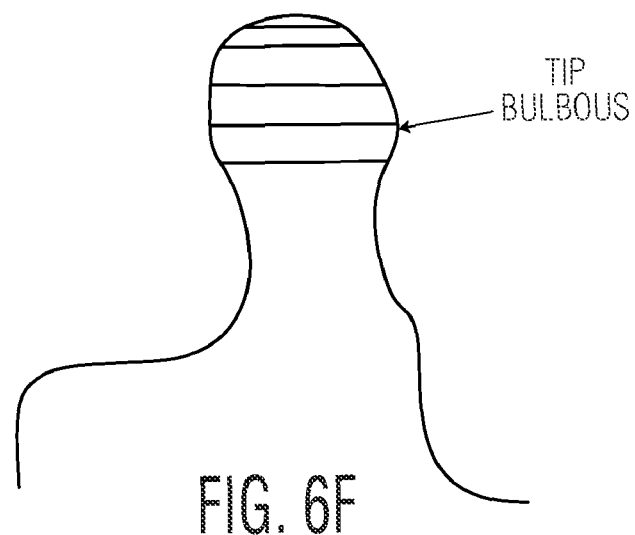

In a next stage, a basic classification of the external morphology is performed. In this stage, the values of $P_i$, $A_i$, $a_i$, $b_i$, and $e_i$ are used to determine basic classification of the shell.

a. If $P_i$, $A_i$, $a_i$, and $b_i$ are all monotonically increasing from the reference point at the canal tip to the aperture of the shell, then the shell has a conical/tapering down shape;
b. If $P_i$, $A_i$, $a_i$, and $b_i$ are all monotonically decreasing from the reference point at the canal tip to the aperture of the shell, then the shell has a bulb/tapering shape; and
c. If $P_i$, $A_i$, $a_i$, and $b_i$ are all uniform from the reference point at the canal tip to the aperture of the shell, then the shell has a cylindrical/non-tapering shape.
d. If $P_i$, $A_i$, $a_i$, and $b_i$ are all uniform from the reference point at the canal tip following by incremental changes in $P_i$, $A_i$, $a_i$, and $b_i$ towards the aperture of the shell, then the shell has a cylindrical/Second Bend Bulbous (see FIG. 6D);
e. If $P_i$, $A_i$, $a_i$, and $b_i$ are all uniform from the reference point at the canal tip followed decrement in $P_i$, $A_1$, $a_i$, and $b_i$ followed again by a uniform $P_i$, $A_i$, $a_i$, and $b_i$ towards the aperture of the shell, then the shell has a cylindrical/double Bulbous (see FIG. 6E); and
f. In the case illustrated in FIG. 6F, $P_i$, $A_i$, $a_i$, and $b_i$ show a slight increment up to about ~7 mm, then an increase in $P_i$, $A_i$, $a_i$, and $b_i$ followed by a uniform taper to the aperture.

The cross-section of impression slices 30 is presumed to be that of a conic section for which eccentricities can be computed for successive slices of the impression canal. Variability in eccentricity determines the approximate shape of the cross sectional area of the slices. Table 1, below, shows the formulae for determining the eccentricities of the slices 30 and the corresponding approximation of the cross sectional areas. The eccentricities allow for the classification of quadric cross sections of the impression. The eccentricity is defined based on the semi-major a and semi-minor b axes of the conic section.

TABLE 1

Cross-sectional Classification of an Impression, Based on the Definition and Range of the Eccentricity Computation as Shown

| Interval | Curve | Eccentricity (E) |
| --- | --- | --- |
| e = 0 | Circular | 0 |
| 0 < e < 1 | Elliptical | $\sqrt{1 - \frac{b^2}{a^2}}$ |
| e = 1 | Parabola | 1 |
| e > 1 | Hyperbola | $\sqrt{1 + \frac{b^2}{a^2}}$ |

Figure 7:
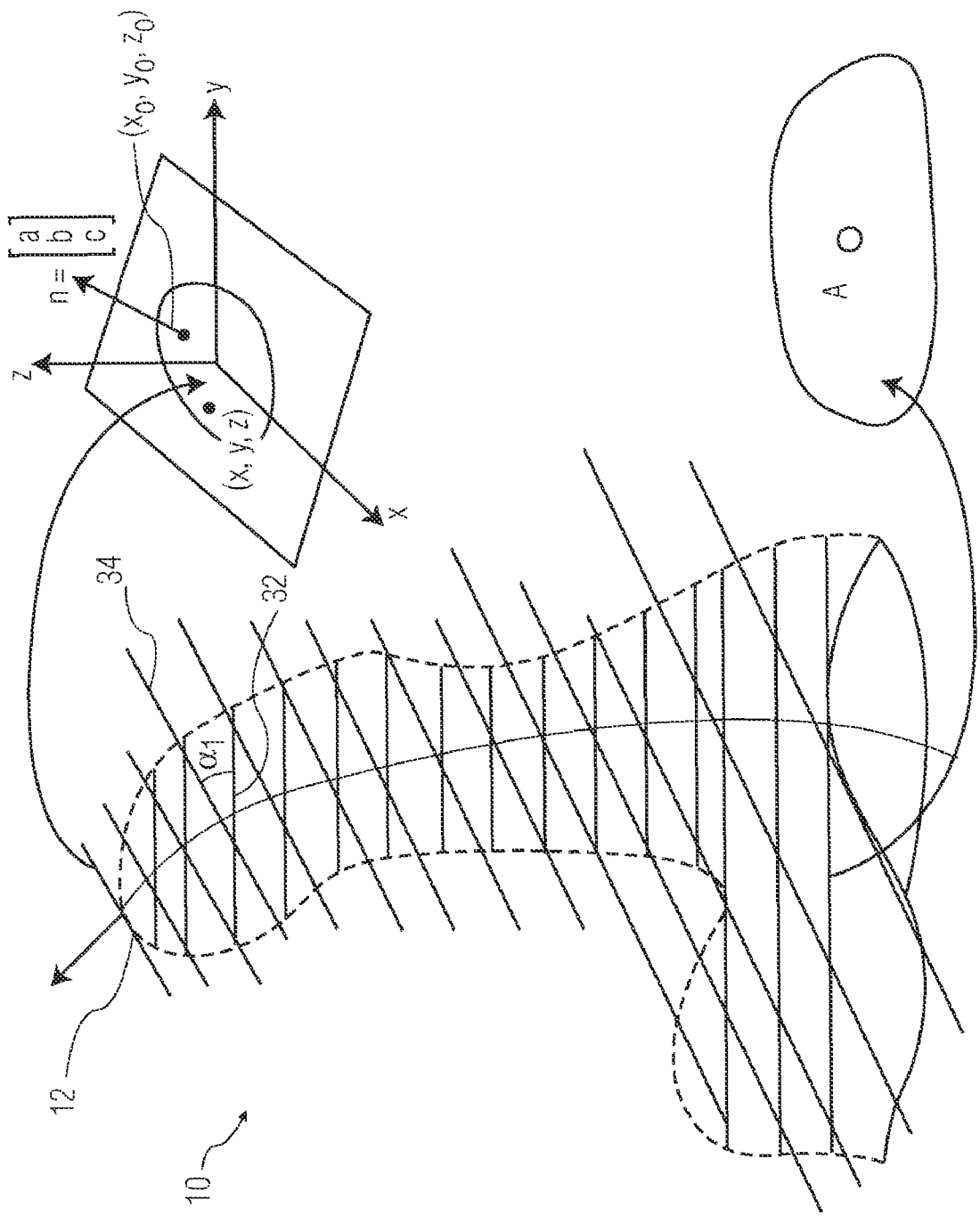
FIG. 7 is a pictorial illustration showing the sectioned impression with two sets of slices, where one set is along the normal of impression canal, and second set is along the hollowed end of the shell.
Figure 8:
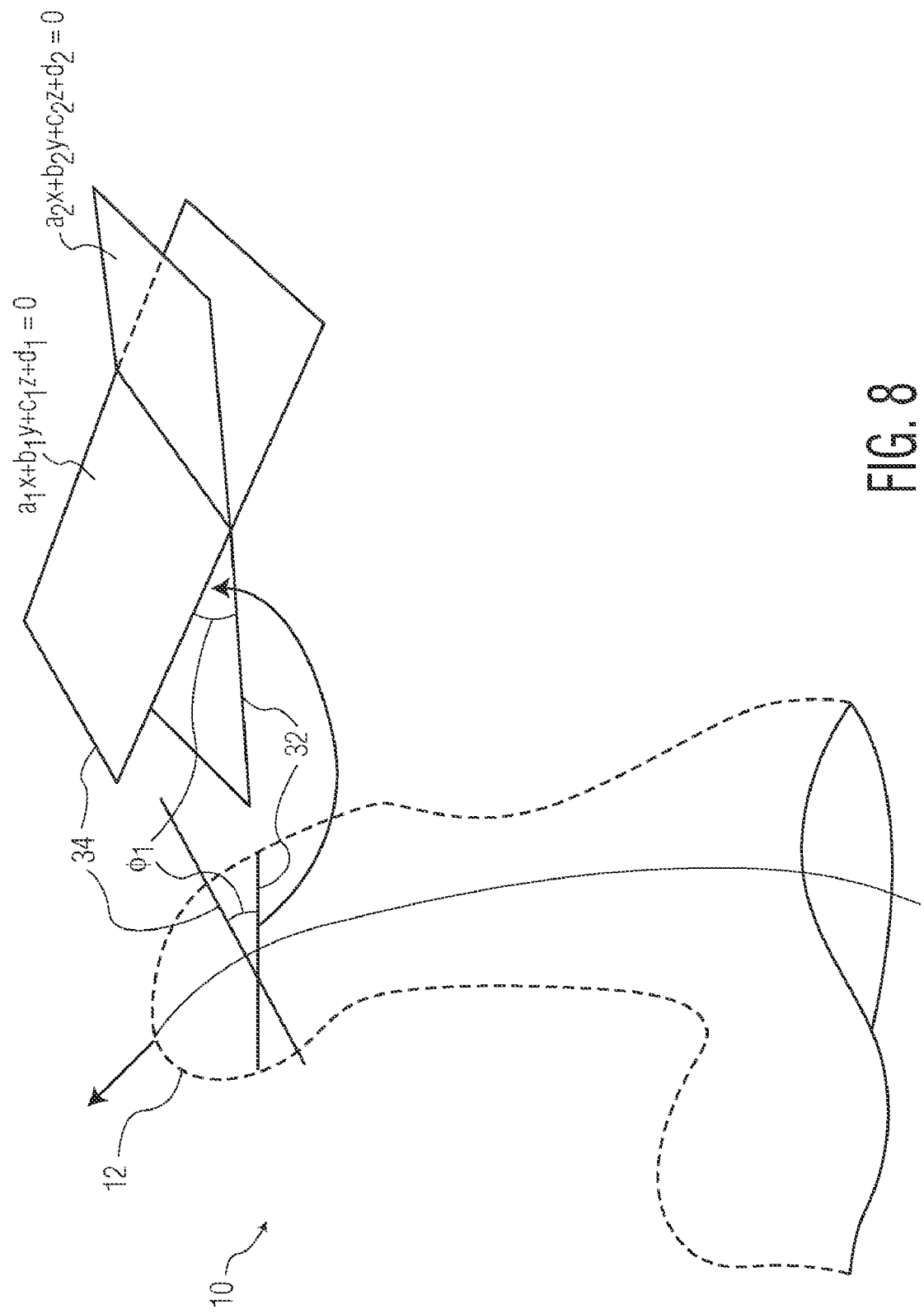
FIG. 8 is a pictorial illustration showing a dihedral computation for two intersecting planes along the two trajectories of an ear impression.

A determination of the characteristic angular shape of the canal is performed. Referring to FIG. 7, the shell impression is sectioned along two reference trajectories 32, 24. One trajectory 32 is oriented such that the slices are aligned along the normal of the canal tip, and the second trajectory 34 references the normal of the hollowed end plane of the impression 10. Both sets of planes 32, 34 intersect at dihedral angles, $\alpha_i$. The dihedral angles are defined as the dot product of the two instantaneous intersection planes (FIG. 8). See Gellert, W.; Gottwald, S.; Hellwich, M.; Kästner, H.; and Künstner, H. (Eds.). VNR Concise Encyclopedia of Mathematics, 2nd ed. New York: Van Nostrand Reinhold, 1989, herein incorporated by reference.

The dot product can be computed as shown in equation 3:

$$\cos\phi_{ij} = \frac{a_i a_j + b_i b_j + c_i c_j}{\sqrt{a_i^2 + b_i^2 + c_i^2}\sqrt{a_j^2 + b_j^2 + c_j^2}} \quad (3)$$

where i=(1, 2 ... n), and j=i=(1, 2 ... m).

An estimate of the angle of bend θ of the ear impression canal can be estimated, as shown in FIG. 7, by the equation:

$$\theta = \max \begin{cases} \frac{1}{n}\sum_{i=0}^{n} \alpha_i \\ \max(\alpha_i) \\ \hat{n}_t \cdot \hat{n}_h \end{cases} \quad (4)$$

where $\hat{n}_t$, $\hat{n}_p$ are the normal of the plane drawn along the minor axis of the canal tip slice 32 and the aperture plane 34, respectively. The dot product of these planes 32, 34 is one of the heuristic measures of the canal bend angle. This parameter can also be computed using the canal tip normal and hollowed end plane.

An estimate of the angle of twist φ can further be performed according to the following equation:

$$\varphi = \max\left\{\frac{1}{m}\sum_{i=0}^{m}(\hat{n}_i \cdot \hat{S}_i)\right\} \quad (5)$$

There is a special case where θ≅φ when the canal is cylindrical straight and non-curved.

Figure 9:
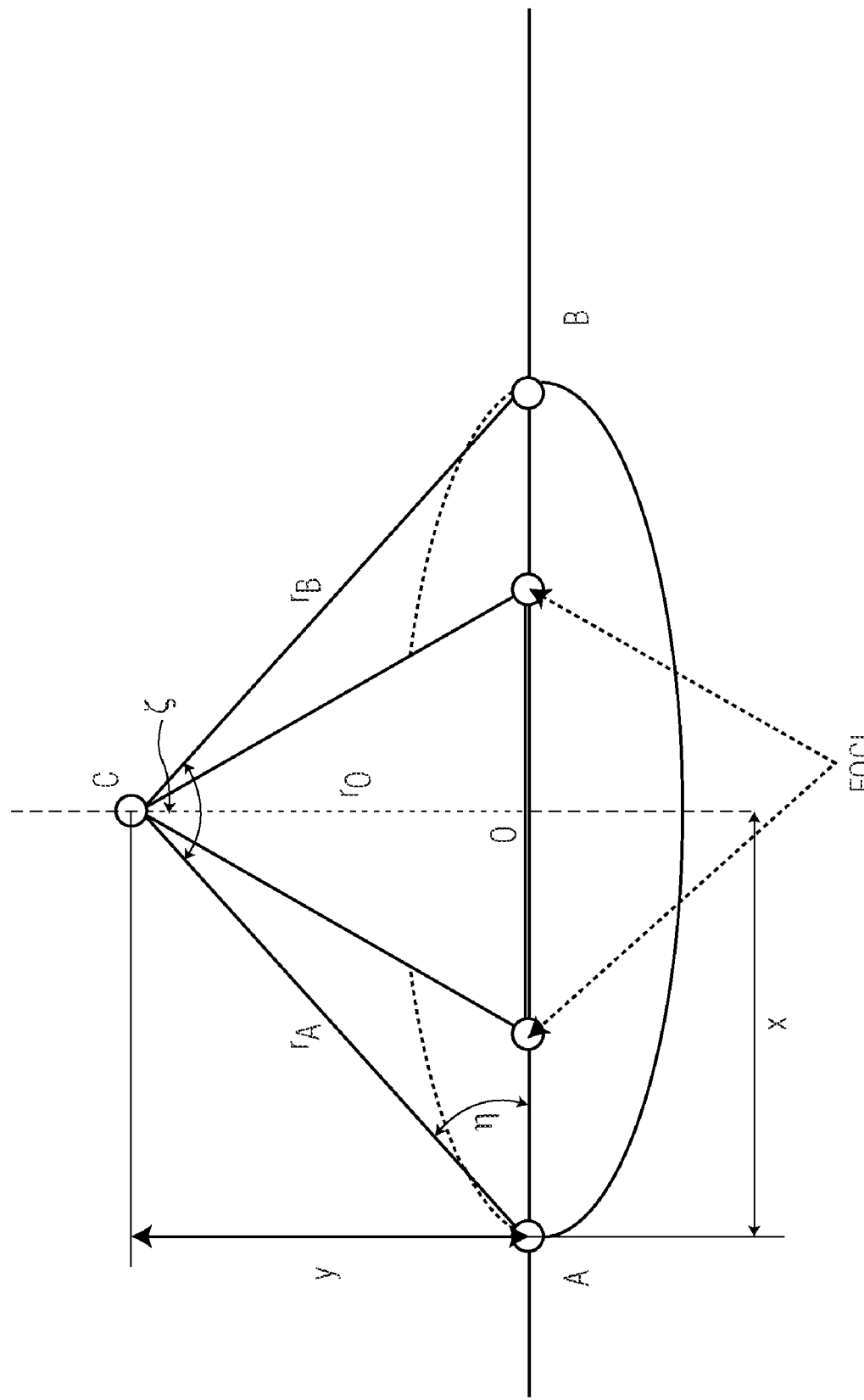
FIG. 9 is a pictorial illustration showing the taper angle estimation by the projection of a ray from the elliptic center to intersect with rays from the loci of the major axis.

An estimate of the taper angle ζ is computed as shown in FIG. 9. The algorithm approach is as follows: first, a ray $r_O$ is projected from the center O of the ellipse (this represents characteristic principal contours at the aperture, first, and second bends respectively) along the normal of the canal tip C; then, two corresponding rays $r_A$, $r_B$ are projected from the loci of points A and B to intersect the ray projected from the elliptic center. Then, the taper angle ζ corresponds to a sweep of the ray at point C between the rays from the loci A and B. This simply illustrates that the cross section slices are amendable to elliptic characterization. Using Pythagoras theory:

$$\operatorname{Tan}\eta = \frac{y}{x} \quad (6)$$

$$\varsigma = 2(90° - \eta)) \quad (7)$$

Figure 10:
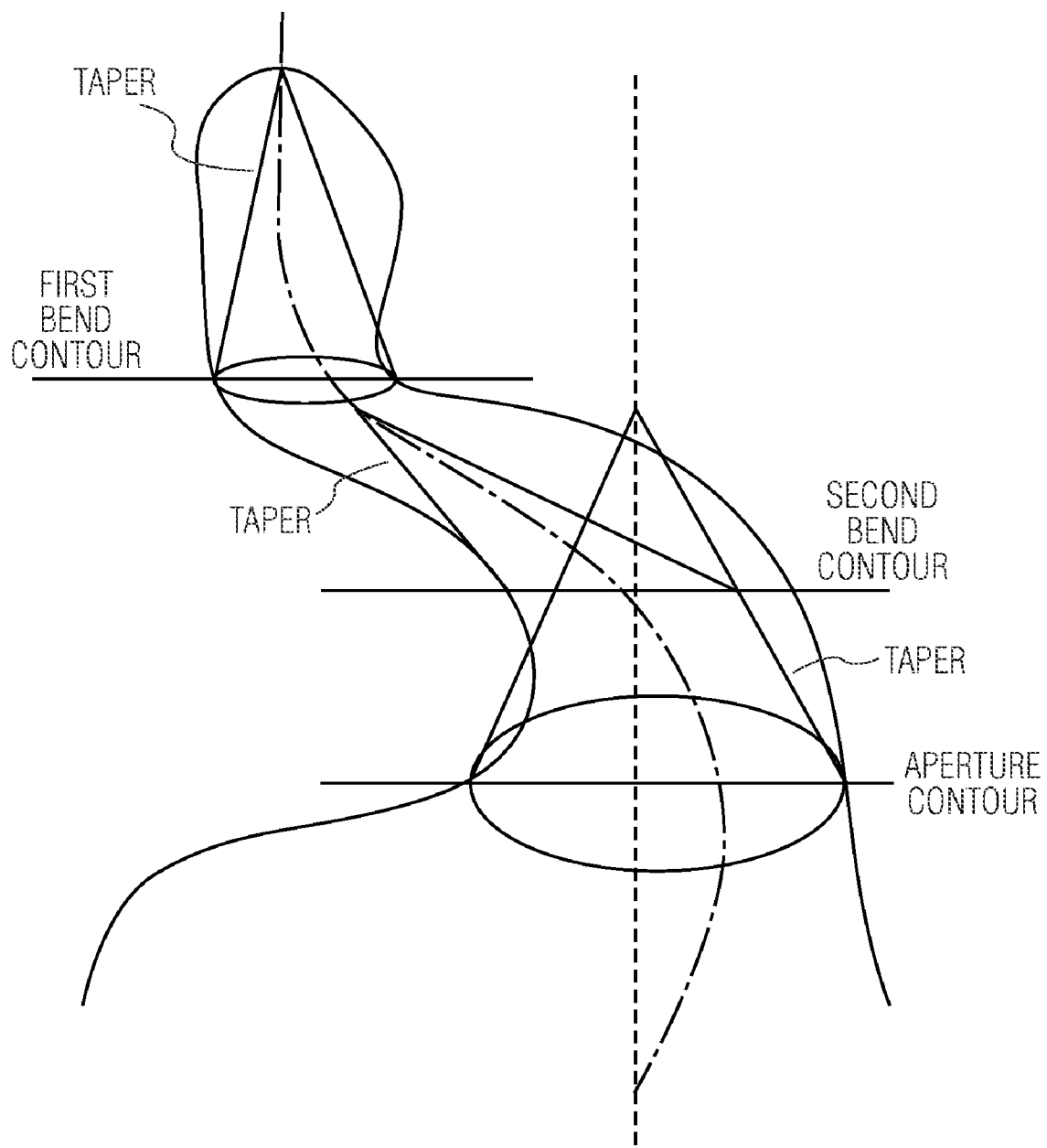
FIG. 10 is a pictorial illustration showing tapering measurement for canal tip tapering of hearing aid impressions.

FIG. 10 illustrates the contours and respective tapers in an impression. By using the above identified techniques, one can provide a classification scheme for classifying hearing instruments impression with the objective of being able to adapt algorithmic robustness for the different classes of impressions realizable from these classifications. With this scheme the following are realizable about a given hearing instrument impression:

1) The cross sectional variations between two references points along the canal—in this case the canal tip and the aperture;
2) The curvature of the impression along the length of the canal; and
3) The eccentricity of the sectional variations.

Advantageously, these can be output in any human or machine readable format for further use in the hearing aid design. The practical basis of this method and apparatus for shell classification are based on the parametric deliverable that characterizes both the physical transitions of the impression as well as its anatomic variability. The following are the key attributes:

Angular Measurements of Orientation along the impression are characterized by: (1) the tapering angle of the impression along the aperture, first, and second bend contour slices; (2) the Resolved Bend Angles indicating twists of the impression along the centerline from the hollow and of the impression to the tip of impression; (3) Slice properties characterized by: (i) Elliptic Areas; (ii) Major and Minor Elliptic Slices; (iii) Elliptic Perimeter; and (iv) Eccentricity.

The Angular measurements (Bend and Taper) provide impression anatomic variability measurements.

The slice characteristics (i)-(iv) provide a classification basis of the cross sectional areas and allows for convergence to characterize shell features such as aperture, first and second bends, and concha. Additionally, it indicates categorically the transition in impression anatomy from the canal tip to the hollowed end.

Using these parametric measures, the following benefits can be obtained for a population of hearing aid impressions: (1) the ability to cluster hearing aid impressions into classes and sub-classes based on the above measurements; (2) the ability to segregate hearing instruments into clusters that require different feature convergence criteria; and (3) an analysis of characteristic features, e.g., the aperture can accurately be determined when the algorithm can substantial dimensional variability along the span of the impression.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

What is claimed is:

1. A method of computer-assisted analysis of ear canal data characteristics for a hearing aid impression, comprising:
    obtaining a 3D data representation of the impression;
    performing a classification on the 3D data representation of the impression to define impression regions, including a canal;
    defining a total number n of slices of the canal;
    slicing the canal into n slices;
    for each slice:
        determining a set of geometric parameters for each slice;
        determining whether a cross-sectional shape of each slice is elliptical, hyperbolical, circular, or parabolic based on the variability of the eccentricities of the slices; and
        for all but the first slice, determining whether the set of parameters is increasing, decreasing, or remaining uniform;

the method further comprising:

performing a basic classification of external canal morphology based on the parameter values for each of the slices to classify the canal as having a shape selected from the group consisting of a conical or tapering down shape, a bulb or tapering shape, and a cylindrical or non-tapering shape;

determining the angular shape of the canal based on angular measurements that characterize changes in the canal shape towards the inner ear and beginning at the aperture; and outputting, via a system output, information related to the canal based on the classification information relating to the slice cross-sectional shape, the external canal morphology, and the canal angular shape and the slice information.

2. The method according to claim 1, wherein the set of geometric parameters for each slice ($S_i$) comprises a semi-major axis ($a_i$), semi-minor axis ($b_i$) area ($A_i$) perimeter ($P_i$), and eccentricity ($e_i$).

3. The method according to claim 2, wherein the perimeter is estimated using a Gauss-Kummer series according to the equation:

$$p_i = \pi(a_i + b) \sum_{n=0}^{\infty} \binom{\frac{1}{2}}{n}^2 h_i^n = \pi(a_i + b_i)\left(1 + \frac{1}{4}h_i + \frac{1}{64}h_i^2 + \ldots \right)$$

where $$\binom{n}{k}$$

is the binomial coefficient, and $$h_i = \left(\frac{a_i - b_i}{a_i + b_i}\right).$$

4. The method according to claim 2, wherein the area is computed by direct integration according to the equation:

$$A_i = \int_{-a_i}^{a_i} \int_{-b_i \frac{\sqrt{a_i^2 - x^2}}{a_i}}^{b_i \frac{\sqrt{a_i^2 - x^2}}{a_i}} dy\,dx.$$

5. The method according to claim 1, wherein a predefined tolerance is provided for each parameter.

6. The method according to claim 1, wherein performing the basic classification further comprises:

classifying the canal as having a conical or tapering down shape if the parameters are all monotonically increasing from a reference point at a tip of the canal to an aperture of the impression;

classifying the canal as having a bulb or tapering shape if the parameters are all monotonically decreasing from the reference point at the canal tip to the aperture; and classifying the canal as having a cylindrical or non-tapering shape if the parameters are all uniform from the reference point at the canal tip to the aperture.

7. The method according to claim 2, wherein the eccentricity for each slice is calculated based on the semi-major axis and the semi-minor axis of a conic section representing the cross-sectional shape of the respective slice.

8. The method according to claim 1, wherein determining the angular shape of the canal comprises:

sectioning the 3D data representation of the impression along a first reference trajectory and along a second reference trajectory, the first reference trajectory being oriented such that slices along the first trajectory are aligned along a normal of the tip of the canal, and the second reference trajectory being oriented such that slices along the second trajectory are aligned along a normal of the hollowed end plane of the impression, wherein first trajectory slices and second trajectory slices form planes that intersect forming respective dihedral angles, each defined as a dot product of the intersecting planes.

9. The method according to claim 8, wherein the dot product is computed according to the equation $$\cos\phi_{ij} = \frac{a_i a_j + b_i b_j + c_i c_j}{\sqrt{a_i^2 + b_i^2 + c_i^2} \sqrt{a_j^2 + b_j^2 + c_j^2}}$$

where i=(1, 2 ... n), and j=i=(1, 2 ... m).

10. The method according to claim 8, further comprising: determining an estimated angle of twist $\phi$ of the canal according to the equation $$\varphi = \max\left\{\frac{1}{m}\sum_{i=0}^{m}(\hat{n}_i \cdot \hat{S}_i)\right\}.$$

11. The method according to claim 8, further comprising determining an estimated taper angle $\zeta$ of the canal, the taper determination comprising:

projecting a center ray from an ellipse center to a normal of the tip of the canal along an aperture, and a first and second bend to monitor any angular changes in an anterior of the impression, an ellipse representing the principal contours at the aperture, the first bend, and the second bend of the canal, respectively;

projecting two locus rays from loci of the respective ellipse to intersect the center ray; and calculating the taper angle $\zeta$ corresponding to an intersection angle of the two locus rays according to $$\mathrm{Tan}\eta = \frac{y}{x}$$

$$\varsigma = 2(90° - \eta)).$$

12. A system for determining ear canal data for a hearing aid impression, comprising:

an input at which a 3D data representation of the impression is provided;

a storage medium for storing the impression data;

a processor for running analysis software, the analysis software comprising:

an algorithm for classifying the impression to define impression regions, including a canal;

an algorithm for slicing the canal into n slices, and then for each slice:

determining a set of geometric parameters for each slice;
determining whether a cross-sectional shape of each slice is elliptical, hyperbolical, circular, or parabolic based on the variability of the eccentricities of the slices; and
for all but the first slice, determining whether each of the set of parameters is increasing, decreasing, or remaining uniform; and
an algorithm for performing a basic classification of external canal morphology based on the parameter values for each of the slices to classify the canal as having a shape selected from the group consisting of a conical or tapering down shape, a bulb or tapering shape, and a cylindrical or non-tapering shape;
an algorithm for determining the angular shape of the canal based on angular measurements that characterize changes in the canal shape towards the inner ear and beginning at the aperture; and
the system further comprising:
a memory for storing the algorithms in a form of processor executable instructions; and
an output for outputting information related to the canal based on the classification information relating to the slice cross-sectional shape, the external canal morphology, and the canal angular shape and the slice information.

13. The method according to claim 1, wherein the performing a classification on the 3D data representation of the impression to define impression regions comprises segmenting the 3D data representation of the impression along canal reference lines, the major axis, the minor axis, and parallel slices from the hollowed end or canal tip and centered on the geometric centerline of the canal, changes in intersecting contours demarcating the location of impression regions.

14. The method according to claim 8, further comprising:
determining an estimated angle of bend θ of the canal according to the equation:

$$\theta = \max \begin{cases} \frac{1}{n}\sum_{i=0}^{n} \alpha_i \\ \max(\alpha_i) \\ \hat{n}_t \cdot \hat{n}_h \end{cases},$$

where $\hat{n}_t$, $\hat{n}_h$ are each the normal of the plane drawn along the minor axis of the canal tip slice and the aperture plane, respectively.

15. A method of computer-assisted analysis of ear canal data characteristics for a hearing aid impression, comprising:
obtaining a 3D data representation of the impression;
performing a classification on the 3D data representation of the impression to define impression regions, including a canal;
defining a total number n of slices of the canal;
slicing the canal into n slices;
for each slice:
determining a set of geometric parameters for each slice;
determining whether a cross-sectional shape of each slice is elliptical, hyperbolical, circular, or parabolic; and
for all but the first slice, determining whether the set of parameters is increasing, decreasing, or remaining uniform;
the method further comprising:
performing a basic classification of external canal morphology based on the parameter values for each of the slices to classify the canal as having a shape selected from the group consisting of a conical or tapering down shape, a bulb or tapering shape, and a cylindrical or non-tapering shape; and
outputting, via a system output, information related to the canal based on the classification information relating to the slice cross-sectional shape and the external canal morphology and the slice information, said performing the basic classification comprising:
classifying the canal as having a conical or tapering down shape if the parameters are all monotonically increasing from a reference point at a tip of the canal to an aperture of the impression;
classifying the canal as having a bulb or tapering shape if the parameters are all monotonically decreasing from the reference point at the canal tip to the aperture; and
classifying the canal as having a cylindrical or non-tapering shape if the parameters are all uniform from the reference point at the canal tip to the aperture.

16. The method according to claim 15, wherein the set of geometric parameters for each slice ($S_i$) comprises a semi-major axis ($a_i$), semi-minor axis ($b_i$), area ($A_i$), perimeter ($P_i$), and eccentricity ($e_i$).

17. The method according to claim 16, wherein the perimeter is estimated using a Gauss-Kummer series according to the equation:

$$p_i = \pi(a_i + b)\sum_{n=0}^{\infty} \binom{\frac{1}{2}}{n}^2 h_i^n = \pi(a_i + b_i)\left(1 + \frac{1}{4}h_i + \frac{1}{64}h_i^2 + \ldots \right)$$

where $$\binom{n}{k}$$

is the binomial coefficient, and $$h_i = \left(\frac{a_i - b_i}{a_i + b_i}\right).$$

18. The method according to claim 16, wherein the area is computed by direct integration according to the equation:

$$A_i = \int_{-a_i}^{a_i} \int_{-b_i\sqrt{a_i^2-x^2}/a_i}^{b_i\sqrt{a_i^2-x^2}/a_i} dy\,dx.$$

19. The method according to claim 16, wherein the eccentricity for each slice is calculated based on the semi-major axis and the semi-minor axis of a conic section representing the cross-sectional shape of the respective slice.

20. The method according to claim 19, wherein the step of determining whether a cross-sectional shape of each slice is elliptical, hyperbolical, circular, or parabolic is based on the variability of the eccentricities of the slices.

* * * * *